United States Patent [19]
Wirth et al.

[11] Patent Number: 5,846,381
[45] Date of Patent: *Dec. 8, 1998

[54] PROCESS FOR MAKING A PRINTING PAPER WITH BINDER MIXTURES FOR PAPER COATING SLIPS

[75] Inventors: Thomas Wirth, Ludwigshafen; Harald Nissler, Hassloch; Berthold Sturm, Worms; Dirk Lawrenz, Maxdorf; Bernhard Schuler, Mannheim, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 619,671
[22] PCT Filed: Jun. 22, 1994
[86] PCT No.: PCT/EP94/02034
§ 371 Date: Mar. 29, 1996
§ 102(e) Date: Mar. 29, 1996
[87] PCT Pub. No.: WO95/11342
PCT Pub. Date: Apr. 27, 1995

[30] Foreign Application Priority Data

Oct. 19, 1993 [EP] European Pat. Off. .............. 93116834

[51] Int. Cl.⁶ ............................. D21H 11/16; D21H 19/28
[52] U.S. Cl. ................... 162/135; 162/164.7; 162/168.1; 427/121

[58] Field of Search ................................. 162/135, 168.1, 162/164.7; 427/121; 428/211, 511

[56] References Cited

U.S. PATENT DOCUMENTS

| | | | |
|---|---|---|---|
| 4,064,304 | 12/1977 | Fujita et al. | 428/207 |
| 4,092,457 | 5/1978 | Fujita et al. | 428/341 |
| 4,245,689 | 1/1981 | Grard et al. | 162/134 |
| 4,503,184 | 3/1985 | Marongiu . | |
| 5,500,191 | 3/1996 | DeMatte | 427/358 |

FOREIGN PATENT DOCUMENTS

| | | |
|---|---|---|
| 99 792 | 2/1984 | European Pat. Off. . |
| 57-191392 | 11/1982 | Japan . |
| 63-275791 | 11/1988 | Japan . |
| 2-169800 | 6/1990 | Japan . |

*Primary Examiner*—Peter Chin
*Attorney, Agent, or Firm*—Keil & Weinkauf

[57] ABSTRACT

Papers which are coated with a paper coating slip based on a binder containing

A) from 1 to 49% by weight of polymers based on esters of acrylic acid or of methacrylic acid with a $C_4$–$C_{12}$-alkanol, having a glass transition temperature of from −80° to +25° C., and B) from 51 to 99% by weight of polymers based on butadiene, the stated weights being based on the sum A)+B), are used for offset printing.

1 Claim, No Drawings

5,846,381

PROCESS FOR MAKING A PRINTING PAPER WITH BINDER MIXTURES FOR PAPER COATING SLIPS

BACKGROUND OF THE INVENTION

1. Field of the Invention

The present invention relates to the use of papers, which are coated with a paper coating slip based on a binder containing A) from 1 to 49% by weight of polymers based on esters of acrylic acid or esters of methacrylic acid with $C_4$–$C_{12}$-alkanols, having a glass transition temperature of from −80° to +25° C., and B) from 51 to 99% by weight of polymers based on butadiene, the stated weights being based on the sum A)+B), said paper being used for offset printing.

In offset printing on coated papers, the problem of non-uniformity of the print, which is specific to this printing process, frequently occurs and is referred to in the trade as mottling. It is still one of the unsolved problems in this area and occupies both paper manufacturers and printers. This phenomenon is an effect which occurs especially in multicolor offset printing in halftones and appears as a sort of cloudiness in the perceived color. The nonuniformity in the print is very evidently due to the fact that the printing ink is more readily accepted in some parts of the paper and less readily in other parts.

The causes of this nonuniform ink acceptance are still not clearly understood today.

The reasons why a better understanding of this phenomenon has not been achieved to date in spite of intensive efforts certainly relate on the one hand to the complicated process of offset printing and, on the other hand, to the structure of paper as printing material, which is no less complicated.

In addition to optimizing the properties of the paper and the printing ink, these components must both be tailored to one another and adapted to the offset printing process.

From the point of view of the paper manufacturer, not only do process engineering parameters in the paper coating process have a major influence in the case of the coated papers, but the physicochemical properties of the coating components also play a decisive role here. The binders used in the coating slips are particularly important.

In addition to natural products, such as starch, predominantly polymer emulsions based on styrene and butadiene or styrene and acrylates are used as binders for paper coating slips.

It is known that there is substantially higher tendency to mottling when binders based on butadiene (co)polymers, for example styrene/butadiene copolymers, are used for coated offset papers, in comparison with acrylate (co)polymers, such as styrene/acrylate copolymers.

It is also known that emulsions based on styrene/butadiene can be mixed with acrylate emulsions.

2. Description of Related Art

Japanese Preliminary Published Application 90/169 800 describes latex mixtures for paper coating comprising butadiene copolymers and acrylate copolymers, which are said to result in homogeneous printing ink acceptance in the paper coat. The latex mixtures (contain acrylate copolymers having an alkyl acrylate content of from 20 to 50% by weight and a minimum film formation temperature of from 35° to 80° C.

Japanese Preliminary Published Application 82/191 392 discloses polymer blends for paper coating which consist of a butadiene copolymer and an acrylonitrile copolymer and give the coated paper high print gloss.

Furthermore, EP-A 099 792 discloses aqueous polymer emulsions containing a mixture of butadiene/styrene copolymers and acrylates with $C_1$–$C_8$-alkanols, and the use thereof in adhesives.

Japanese Preliminary Published Application 63-27579 from the year 1988 discloses binders for paper coating slips, which contain copolymers A) and B) of the type defined above. The papers coated in this manner are suitable for the gravure printing process. However, the gravure printing process differs in principle from the offset printing process and consequently the requirements for the paper and paper coating slips also differ. In the offset printing process, the printing and nonprinting parts of the printing plate are in one plane. When the printing plate is inked, use is made of the incompatibility of the printing inks with water (damping of the nonprinting parts). The paper to be printed is therefore exposed to a printing ink/water system, which does not occur in gravure printing.

SUMMARY OF THE INVENTION

It is an object of the present invention to provide binders which are suitable for paper coating slips and which have a generally good property profile, especially in offset printing, in combination with improved uniform printability, ie. very little tendency to mottling.

We have found that this object is achieved by the use defined at the outset.

The copolymers described below are used as components for paper coating slips:

Component (A) comprises polymers based on esters of acrylic acid and/or methacrylic acid with $C_4$–$C_{12}$-alkanols or mixtures of such esters, the polymers having calculated glass transition temperatures Tg (according to Fox) of from −80° to 25°C., preferably from −60° to 0° C., particularly preferably from −50° to −15° C. Particularly suitable alkanols are butanol and 2-ethylhexanol, as well as isobutanol, tert-butanol, n-pentanol, isoamyl alcohol, n-hexanol, cyclohexanol, octanol and lauryl alcohol.

The glass transition temperature can be calculated according to Fox (T. G. Fox, Bull. Am. Phys. Soc. (Ser. II) 1 (1956), 123). According to this publication, a good approximation for the glass transition temperature of copolymers is $$\frac{1}{Tg} = \frac{X^1}{Tg^1} + \frac{X^2}{Tg^2} + \ldots + \frac{X^n}{Tg^n}$$

where $X^1, X^2 \ldots X^n$ are mass fractions of the monomers 1, 2, … n and $Tg^1, Tg^2 \ldots Tg^n$ are glass transition temperatures of the monomers 1, 2 … n in degrees Kelvin.

The Tg of the essential monomers are known and are stated, for example, in J. Brandrup, E. H. Immergut, Polymer Handbook, 1st Ed., J. Wiley & Sons, New York 1966.

DESCRIPTION OF THE PREFERRED EMBODIMENTS

The minimum film formation temperatures (MFT) are preferably below 0° C. They are usually of the same magnitude as the Tg but may occasionally be substantially lower, possibly because emulsifiers or water are used as plasticizers (cf. Ullmanns Encyklopädie, Vol. A21, page 169, 5th edition).

The polymers A) are water-insoluble.

Polymers A) of ($a_1$) from 50 to 100, preferably from 50 to 99, particularly preferably from 80 to 99, % by weight of the abovementioned $C_4$–$C_{12}$-alkyl esters of acrylic acid and/or of methacrylic acid, (a₂) from 0 to 50, preferably from 0 to 35, particularly preferably from 0 to 20, % by weight of a vinylaromatic of up to 20 carbon atoms, such as α-methylstyrene, p-methylstyrene, vinyltoluene or in particular styrene, and (a₃) from 0 to 15, preferably from 1 to 5, % by weight of further olefinically unsaturated monomers are advantageously used.

One or more unsaturated carboxylic acids and/or the amides and/or anhydrides thereof, for example acrylic acid, acrylamide, methacrylic acid, methacrylamide, itaconic acid, maleic acid or fumaric acid, vinylsulfonic acid, vinylphosphonic acids or acrylamidopropanesulfonic acid and the water-soluble salts thereof are preferred. The amount of unsaturated acids is particularly preferably less than 4% by weight.

Furthermore, suitable monomers (a₃) are monomers capable of free radical polymerization, such as olefins, eg. ethylene, vinyl and vinylidene halides, such as vinyl and vinylidene chloride, esters of vinyl alcohols and monocarboxylic acids of 1 to 18 carbon atoms, such as vinyl acetate, vinyl propionate, vinyl n-butyrate, vinyl laurate and vinyl stearate, and esters of α,β-monoethylenically unsaturated dicarboxylic acids, such as maleic acid, fumaric acid and itaconic acid, with alkanols of in general 1 to 12, preferably 1 to 9, in particular 1 to 4, carbon atoms, such as dimethyl maleate or n-butyl maleate. Other examples are basic monomers, such as

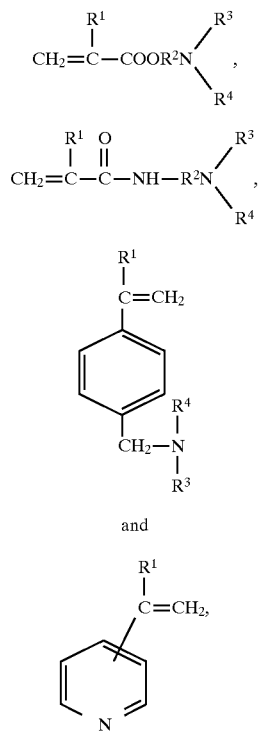

where
R¹ is H or CH₃,
R² is alkylene of 1 to 4 carbon atoms and
R₃ and R⁴ are each H or alkyl of 1 to 4 carbon atoms,
and other monomers which contain basic centers, are capable of free radical polymerization and may also be in N-protonated or N-alkylated form, for example diallyldimethylammonium chloride.

Crosslinking monomers may also be present in polymer A) in amounts of from 0 to 10% by weight, as monomers which contain a further crosslinking functional group in addition to the group capable of free radical polymerization.

Examples of such monomers are conjugated $C_4$–$C_8$-dienes, such as 1,3-butadiene and isoprene, and monomers which are capable of free radical polymerization and have at least one epoxy, hydroxyl, N-alkylol, N-alkoxy, carbonyl or amidine group or at least two nonconjugated ethylenically unsaturated double bonds. A combination of such compounds is of course also possible. Examples of epoxy-containing monomers are glycidyl acrylate, glycidyl methacrylate and vinyl glycidyl ether.

Preferred N-alkylol compounds are the N-alkylolamides of ethylenically unsaturated carboxylic acids where the alkyl radical is of 1 to 4 carbon atoms, such as N-methylolacrylamide, N-ethanolacrylamide, N-propanolacrylamide, N-methylolmethacrylamide, N-ethanolmethacrylamide, N-methylolmaleimide, N-methylolmaleamide and N-methylol-p-vinylbenzamide.

Suitable N-alkoxymethylacrylamides and N-alkoxymethylmethacrylamides are primarily compounds where the alkoxy radical is of 1 to 8 carbon atoms, such as N-(methoxymethyl)acrylamide, N-(butoxymethyl) acrylamide, N-(methoxymethyl)methacrylamide and N-(butoxymethyl)methacrylamide, and methylolallyl carbamates whose methylol groups may be etherified with $C_1$–$C_8$-alkyl. Preferred carbonyl-containing monomers are acrolein, diacetoneacrylamide, formylstyrene, vinyl alkyl ketones and (meth)acryloyloxyalkylpropanals according to European Patent 0,003,516, diacetone acrylate, acetonyl acrylate, diacetone methacrylate, 2-hydroxypropyl acrylate acetylacetate and 1,4-butanediol acrylate acetylacetate.

2-(1-Aziridinyl)ethyl methacrylate is an example of an aziridinyl-containing monomer.

Examples of crosslinking components having at least two acrylate, methacrylate, alkyl or vinyl groups or corresponding combinations are alkylene glycol di(meth)acrylates, such as ethylene glycol diacrylate, 1,3-butylene glycol diacrylate, propylene glycol diacrylate and triethylene glycol dimethacrylate, 1,3-glyceryl dimethacrylate, 1,1,1-trimethylol propane dimethacrylate, 1,1,1-trimethylolethane diacrylate, pentaerythrityl trimethacrylate, sorbitan pentamethacrylate, methylenebisacrylamide, methylenebismethacrylamide, divinylbenzene, vinyl methacrylate, vinyl crotonate, vinyl acrylate and divinyl adipate, diallyl phthalate, allyl methacrylate, allyl acrylate, diallyl maleate, diallyl itaconate, diallyl malonate, diallyl carbonate, triallyl citrate, divinyl ether, ethylene glycol divinyl ether and cyclopentadienyl acrylate and methacrylate.

Further suitable monomers are those having $SiR^1R^2R^3$ groups, in which $R^1$, $R^2$ and $R^3$ independently of one another are each $C_1$–$C_4$-alkyl or alkoxy, such as methyl, ethyl, methoxy or ethoxy, for example vinyl trialkoxysilanes, acryloyloxysilanes, such as γ-methacryloyloxypropyltrimethoxysilane and methacryloyloxyethyltrimethylsilane.

In addition to the use of such crosslinking monomers, the internal strength of the polymer films can in certain circumstances be increased by adding metal salts, for example Ca, Mg or Zn salts, after polymerization is complete, provided that said films contain groups capable of bonding with these salts, for example carboxyl groups; it is also possible to add hydrazine derivatives, aminooxyalkanes and condensates based on formaldehyde, melamine, phenol and/or urea after polymerization is complete.

The components (A) usually contain acrylonitrile or methacrylonitrile in amounts of less than 5, preferably less than 2, % by weight.

In a preferred embodiment, polymers (A) which were prepared in the presence of a molecular weight regulator, for example tertdodecyl mercaptan, carbon tetrachloride, carbon tetrabromide, trichlorobromomethane, butyl mercaptan, allyl alcohol, polytetrahydrofuranbisthiol, mercaptoethanol, acetylacetone, thioglycolic acid or thioglycolates, are used. Such substances are preferably added to the reaction mixture as a mixture with the monomers to be polymerized.

Suitable polymers A) generally have number average particle sizes of from 50 to 1000 nm, in particular from 80 to 500 nm, particularly preferably from 100 to 300 nm. Bimodal or polymodal particle size distributions may also be advantageous.

Suitable polymers B) advantageously consist of from 10 to 100, in particular from 20 to 80, particularly preferably from 20 to 50, % by weight of butadiene and from 0 to 90, in particular from 20 to 80, particularly preferably from 50 to 80, % by weight of styrene or of the abovementioned vinylaromatics and from 0 to 10% by weight of further comonomers, such as monounsaturated or polyunsaturated carboxylic acids and/or the amides thereof and/or the anhydrides thereof, for example acrylic acid, methacrylic acid, itaconic acid or (meth)acrylamide.

The component (B) may also contain from 0 to 10% by weight of further comonomers, preferably acrylonitrile and/or methacrylonitrile and/or esters of (meth)acrylic acid with $C_1$–$C_{12}$-alkanols.

Molecular weight regulators in amounts of from 0 to 5% by weight, based on the amount of monomers used, may be employed for the preparation of the polymers (B). Suitable substances are mentioned in connection with the preparation of the components (A).

The polymeric components A) and B) can be prepared in a conventional manner by solution or emulsion polymerization using conventional free radical polymerization initiators.

The polymer B) is likewise water-insoluble.

Suitable free radical polymerization initiators are all those which are capable of initiating a free radical aqueous emulsion polymerization. These may be both peroxides, for example alkali metal peroxodisulfates, dibenzoyl peroxide, γ-butyl perpivalate, tert-butyl per-2-ethylhexanoate, 2,5-dimethyl-2,5-di-(tert-butylperoxy)-hexane or cumene hydroperoxide, and azo compounds, such as azobisisobutyronitrile or 2,2'-azobis(2-amidinopropane) dihydrochloride.

The combined systems which are composed of at least one organic reducing agent and at least one peroxide and/or hydroperoxide, for example tert-butyl hydroperoxide and the sodium salt of hydroxymethanesulfinic acid or hydrogen peroxide and ascorbic acid, are also suitable. Combined systems which additionally contain a small amount of a metal compound which is soluble in the polymerization medium and whose metallic component may occur in a plurality of valency states, for example ascorbic acid/iron(II) sulfate/hydrogen peroxide, are also useful, the sodium salt of hydroxymethanesulfinic acid, sodium sulfite, sodium bisulfite or sodium metabisulfite also frequently being used instead of ascorbic acid, and tert-butyl hydroperoxide or alkali metal peroxodisulfates and/or ammonium peroxodisulfates also frequently being used instead of hydrogen peroxide. As a rule, the amount of free radical initiator systems used is from 0.1 to 3% by weight, based on the total amount of the monomers to be polymerized. Ammonium and/or alkali metal peroxodisulfates, as such or as part of combined systems, are particularly preferably used as initiators. Sodium peroxodisulfate is particularly preferably used.

The manner in which the free radical initiator system is added to the polymerization vessel in the course of the novel free radical aqueous emulsion polymerization is known to a person skilled in the art. It may be initially taken in its entirety in the polymerization vessel or added continuously or stepwise at the rate at which it is consumed in the course of free radical aqueous emulsion polymerization. This depends specifically, in a manner known per se to a person skilled in the art, both on the chemical nature of the initiator system and on the polymerization temperature. Preferably, a portion is initially taken and the remainder is added to the polymerization zone at the rate of consumption.

In the case of the emulsion polymerization, known ionic and/or nonionic emulsifiers and/or protective colloids or stabilizers can usually be used.

Suitable surfactants of this type are in principle the protective colloids and emulsifiers usually used as dispersants. A detailed description of suitable protective colloids appears in Houben-Weyl, Methoden der organischen Chemie, Volume XIV/1, Makromolekulare Stoffe, Georg-Thieme-Verlag, Stuttgart, 1961, pages 411 to 420. Anionic, cationic and nonionic emulsifiers are suitable as accompanying emulsifiers. Exclusively emulsifiers whose relative molecular weights are usually less than 2000, in contrast to the protective colloids, are preferably used. Where mixtures of surfactants are used, the individual components must of course be compatible with one another, which in case of doubt can be checked by means of a few preliminary experiments. Anionic and nonionic emulsifiers are preferably used as accompanying surfactants. Conventional accompanying emulsifiers are, for example, ethoxylated fatty alcohols (degree of ethoxylation: from 3 to 50, alkyl radical: $C_8$ to $C_{36}$), ethoxylated mono-, di- and trialkylphenols (degree of ethoxylation: from 3 to 50, alkyl radical: $C_4$ to $C_9$), alkali metal salts of dialkyl esters of sulfosuccinic acid and alkali metal and ammonium salts of alkylsulfates (alkyl radical: $C_8$ to $C_{12}$), of ethoxylated alkanols (degree of ethoxylation: from 4 to 30, alkyl radical: $C_{12}$ to $C_{18}$), of ethoxylated alkylphenols (degree of ethoxylation: from 3 to 50, alkyl radical: $C_4$ to $C_9$), of alkanesulfonic acids (alkyl radical: $C_{12}$ to $C_{18}$) and of alkylarylsulfonic acids (alkyl radical: $C_9$ to $C_{18}$).

Further suitable dispersants are compounds of the general formula II

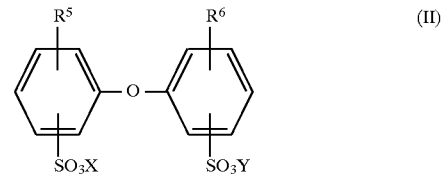

where $R^5$ and $R^6$ are each hydrogen or $C_4$–$C_{14}$-alkyl and are not simultaneously hydrogen and X and Y may be alkali metal ions and/or ammonium ions. $R^5$ and $R^6$ are each preferably linear or branched alkyl of 6 to 18, in particular 6, 12 or 16, carbon atoms or hydrogen, $R^5$ and $R^6$ not both being hydrogen simultaneously. X and Y are preferably sodium, potassium or ammonium ions, sodium being particularly preferred. Compounds II in which X and Y are each sodium, $R^5$ is branched alkyl of 12 carbon atoms and $R^6$ is hydrogen or $R^5$ are particularly advantageous. Industrial mixtures which contain from 50 to 90% by weight of the monoalkylated product, for example Dowfax® 2A1 (trademark of Dow Chemical Company) are frequently used.

Further suitable emulsifiers are described in Houben-Weyl, Methoden der organischen Chemie, Volume XIV/1, Makromolekulare Stoffe, Georg Thieme Verlag, Stuttgart, 1961, pages 192 to 208.

The emulsions can also be prepared using a protective colloid in addition to an existing emulsifier or in the absence of an emulsifier, and the amount of the protective colloid may be up to 100, preferably from 0.5 to 30, % by weight, based on the amount of the monomers used.

In the process, this protective colloid may be added completely or partially, at the same time as the monomers or at a different time, together with the monomers or separately therefrom; it may be advantageous initially to take up to 30, preferably up to 10, % by weight, based on monomers, of protective colloid in aqueous solution.

Examples of natural protective colloids are starch, casein, gelatine and alginates, and examples of modified natural products are hydroxyethylcellulose, methylcellulose and carboxymethylcellulose, as well as cationically modified starch. Suitable synthetic protective colloids include polyacrylic acid and salts thereof, polyacrylamides, water-soluble acrylic acid copolymers, water-soluble acrylamide copolymers, polyvinylpyrrolidones, polyvinyl alcohols and partially hydrolyzed polyvinyl alcohols.

It may be advantageous if some of the protective colloid is grafted onto the polymer.

The emulsion polymerization is carried out, as a rule, at from 30° to 95° C., preferably from 75° to 90° C. The polymerization medium may consist of water alone or of a mixture of water and water-miscible liquids, such as methanol. Preferably, water alone is used. The emulsion polymerization may be carried out both as a batchwise process and in the form of a feed process, including the step or gradient procedure. The feed process, in which some of the polymerization batch is initially taken, heated to the polymerization temperature and polymerized and the remainder of the polymerization batch is then added to the polymerization zone, usually via a plurality of spatially separated feeds, one or more of which contain the monomers in pure or emulsified form, continuously, stepwise or with superposition of a concentration gradient, while maintaining the polymerization is preferred.

The novel free radical aqueous emulsion polymerization can of course also be carried out at superatmospheric or reduced pressure.

The novel aqueous polymerization emulsions are generally prepared with total solids contents of from 15 to 65, preferably from 40 to 60, % by weight.

The latices may contain conventional assistants, such as potassium hydroxide, ammonia or ethanolamine as neutralizing agents, silicone compounds as antifoams, biocides and silicone oils or waxes for reducing the tack.

The binder mixtures contain the component A) in amounts of from 1 to 49, preferably from 1 to 19, particularly preferably from 5 to 15, % by weight, based on the sum A)+B). The component B) is present in amounts of from 51 to 10, preferably from 81 to 99, particularly preferably from 85 to 95, % by weight, based on the sum A)+B), the amounts of A) and B) summing to one hundred.

The components A) and B) are used in the binder mixtures suitable for paper coating slips preferably in the form of aqueous emulsions.

The aqueous emulsions of these binder mixtures have solids contents of from 15 to 65, preferably from 40 to 60, % by weight. Said emulsions are preferably prepared by mixing the emulsions of the individual components with stirring at room temperature.

The paper coating slips contain the claimed binder mixtures in amounts of from 1 to 20, preferably from 5 to 15, % by weight, based on the pigment content of the paper coating slips.

Pigments are usually the main component of the paper coating slips. Frequently used pigments are, for example, barium sulfate, calcium carbonate, calcium sulfoaluminate, kaolin, talc, titanium dioxide, zinc oxide, chalk or coating clay.

The paper coating slips may also contain conventional dispersants. Suitable dispersants are polyanions, for example of polyphosphoric acids or of polyacrylic acids (polysalts), which are usually present in amounts of from 0.1 to 3% by weight, based on the amount of pigment.

The paper coating slips may furthermore contain cobinders. Examples of natural cobinders are starch, casein, gelatine and alginates, and examples of modified natural products are hydroxyethylcellulose, methylcellulose and carboxymethylcellulose, as well as cationically modified starch. However, conventional synthetic cobinders, eg. those based on vinyl acetate or on acrylate, may also be used.

These may be present in amounts of from 0.1 to 10% by weight, based on the amount of pigment.

The paper coating slips can be applied by the conventional method to the papers to be coated (cf. Ullmann's Encyklopadie der Technischen Chemie, 4th Edition, Vol. 17, page 603 et seq.).

The papers coated in this manner have good uniform printability, ie. very little tendency to mottling, in the subsequent printing process by the offset printing method, ie. in contact with the printing ink/water system.

EXAMPLE 1

Preparation of the components A1 of the mixture
Initially taken mixture:
14.00 g of sodium laurylsulfate (10% strength in water)
2.222 g of the sodium salt of $C_{12}$-alkyldiphenyl ether disulfate (45% strength in water)
82.10 g of feed 1
6.25 g of feed 2
296.00 g of demineralized water
Feed 1:
2.000 g of sodium pyrophosphate
16.00 g of sodium lauryl sulfate (10% strength in water)
11.11 g of the sodium salt of $C_{12}$-alkyldiphenyl ether disulfate (45% strength in water)
30.93 g of acrylic acid
900.00 g of n-butyl acrylate
100.00 g of styrene
2.000 g of tert-dodecyl mercaptan
100.00 g of demineralized water
Feed 2:
5.000 g of sodium peroxodisulfate
120.00 g of demineralized water
Feed 3:
10.00 g of tert-butyl hydroperoxide (10% strength in water)
Feed 4:
10.00 g of the sodium salt of hydroxymethanesulfinic acid (10% strength in water).

The initially taken mixture was heated to 85° C. and polymerized for 15 minutes. Thereafter, the remainder of feed 1 was first added at 85° C. in the course of 2 hours and, beginning simultaneously with feed 1, the remainder of feed 2 was added in the course of 2.5 hours. The reaction mixture was then stirred for a further hour at 85° C., then cooled to 25° C., after which feeds 3 and 4 were added. An emulsion having a solids content of 51.3% by weight and a pH of 2.4 was obtained. Particle size (Malvern Autosizer): 151 nm.

Calculated glass transition temperature according to Fox: −28° C., minimum film formation temperature: <0° C.

The minimum film formation temperature was measured according to DIN 53 787 (1974) at a dry film thickness of 20 μm in an air stream of 1300 l/h at 21° C.

EXAMPLE 2

Preparation of the components A2 of the mixture
Initially taken mixture:
10.50 g of sodium lauryl sulfate (10% strength in water)
1.667 g of the sodium salt of $C_{12}$-alkyldiphenyl ether disulfate (45% strength in water)
61.33 g of feed 1
5.19 g of feed 2
220.00 g of demineralized water
Feed 1:
1.500 g of sodium pyrophosphate
12.00 g of sodium lauryl sulfate (10% strength in water)
8.333 g of the sodium salt of $C_{12}$-alkyldiphenyl ether disulfate (45% strength in water)
23.20 g of acrylic acid
675.00 g of ethylhexyl acrylate
75.00 g of styrene
1.500 g of tert-dodecyl mercaptan
430.00 g of demineralized water
Feed 2:
3.750 g of sodium peroxodisulfate
100.00 g of demineralized water
Feed 3:
7.500 g of tert-butyl hydroperoxide (10% strength in water)
Feed 4:
7.500 g of the sodium salt of hydroxymethanesulfinic acid (10% strength in water).

The initially taken mixture was heated to 85° C. and polymerized for 15 minutes. Thereafter, the remainder of feed 1 was added at 85° C. in the course of 2 hours and, beginning simultaneously with feed 1, the remainder of feed 2 was added in the course of 2.5 hours. The reaction mixture was stirred for a further hour at 85° C. and then cooled to 25° C. Feed 3 and feed 4 were then added in the course of one hour. The emulsion thus obtained had a solids content of 50.3% by weight. Particle size: 164 nm Calculated glass transition temperature according to Fox: −41° C., minimum film formation temperature (MFT) <0° C.

EXAMPLE 3

Preparation of the components A3 of the mixture
The preparation was carried out similarly to Example 1, but without the use of tert-dodecyl mercaptan as a regulator. An emulsion having a solids content of 50.9% by weight was obtained. Particle size: 164 nm Calculated glass transition temperature: −28° C. MFT: <0° C.

EXAMPLE 4

Preparation of the components A4 of the mixture
The preparation was carried out similarly to Example 2, but without the use of tert-dodecyl mercaptan as a regulator. An emulsion having a solids content of 50.2% by weight was obtained. Particle size: 164 nm Calculated glass transition temperature: −41° C. MFT: <0° C.

EXAMPLE 5

Preparation of the butadiene/styrene emulsion
0,25 kg of sodium lauryl sulfate (10% strength by weight in water)
3.88 kg of feed 1
1.05 kg of feed 2
19.40 kg of demineralized water
Feed 1:
2.75 kg of sodium lauryl sulfate (10% strength by weight in water)
0.50 kg of tert-dodecyl mercaptan
1.50 kg of acrylic acid
17.50 kg of butadiene
31.00 kg of styrene.
24.25 kg of demineralized water
Feed 2:
0.40 kg of sodium peroxodisulfate
4.85 kg of demineralized water The initially taken mixture was heated to 85° C. and polymerized for 15 minutes. Thereafter, the remainder of feed 1 was added in the course of 5 hours and, beginning simultaneously with feed 1, feed 2 was added in the course of 5.5 hours. Particle size: 170 nm Solids content: 50% by weight Tg (DSC measurement): 17° C. pH: 2.1

EXAMPLE 6

Preparation of the binder mixtures
The mixtures were prepared by mixing corresponding amounts (cf. Table 1 below) of the butadiene/styrene copolymer emulsion (Example 5) and one of the components A1 to A4 of the mixture.

TABLE 1

| Binder mixtures | |
|---|---|
| Mixture 1 | 95 parts S/Bu emul. + 5 parts comp. A1 |
| Mixture 2 | 90 parts S/Bu emul. + 10 parts comp. A1 |
| Mixture 3 | 95 parts S/Bu emul + 5 parts comp. A2 |
| Mixture 4 | 90 parts S/Bu emul. + 10 parts comp. A2 |
| Mixture 5 | 95 parts S/Bu emul. + 5 parts comp. A3 |
| Mixture 6 | 90 parts S/Bu emul. + 10 parts comp. A4 |

The binder mixtures described in Table 1 and the butadiene/styrene emulsion described in Example 5 (comparative example) were used as binders in a paper coating slip having the composition stated below:
60 parts of finely divided chalk
40 parts of finely divided clay
1 part of carboxymethylcellulose
0.6 part of a sodium salt of a polyacrylic acid having a molecular weight of 4000 (polysalt BASF)
12 parts of binder emulsion (mixtures 1 to 6 or Example 5)
Solids content: 66% by weight, pH: from 8.5 to 9 (adjusted with NaOH).

The base paper used was a wood-free coating paper having a basis weight of 70 g/m². The coating slip was applied on both sides, in each case in an amount of 13 g/m², on a pilot coating apparatus (application method: roll, metering method: blade) at a rate of 1000 m/min. The paper web was brought to a paper moisture content of 5.5% by means of an IR drying unit and air drying. The maximum web temperature was 100° C.

The paper web was calendered by a single pass through a supercalender. The nip pressure was 250 kN/m, the web speed was 300 m/min and the temperature was 80° C.

The print was visually assessed and rated with regard to the tendency to mottling. On a rating scale of 1 to 6, 1=very good and 6=very poor. At the same time, mottle scan values were determined with the aid of a Tobias tester. (The method of measurement is described in: Philipp E. Tobias et al., Tappi Journal, Vol. 72, No. 5, May 1989.) The mottle scan values were determined in an ink area which was printed with an ink coverage of 90% of the maximum ink coverage with the color cyan on a 4-color offset printing press by the sheet-feed offset printing process.

TABLE 2

| Binder | Tendency to mottling[1] | Mottle scan values |
|---|---|---|
| Mixture 1 | 2 | 171.5 |
| Mixture 2 | 1 | 168.5 |
| Mixture 3 | 2 | 172.0 |
| Mixture 4 | 1 | 170.0 |
| Mixture 5 | 2 | 173,5 |
| Mixture 6 | 2 | 172,0 |
| Comparative example Bu-S copolymer | 5 | 214,0 |

[1] 1 = very poor mottling
6 = pronounced mottling

We claim:

1. A process for making a printing paper wherein a base paper is coated with a paper coating slip containing a binder consisting essentially of A) from 1 to 19% by weight of water-insoluble polymers based on esters of acrylic acid or of methacrylic acid $C_4$–$C_{12}$-alkanol, having a glass transition temperature of from −50° to −15° C. and B) from 81 to 99% by weight of a polymers based on butadiene, the stated weight being based on the sum A)+B)

and the paper coated in this manner is printed by an offset printing process.

* * * * *